Patented June 20, 1933

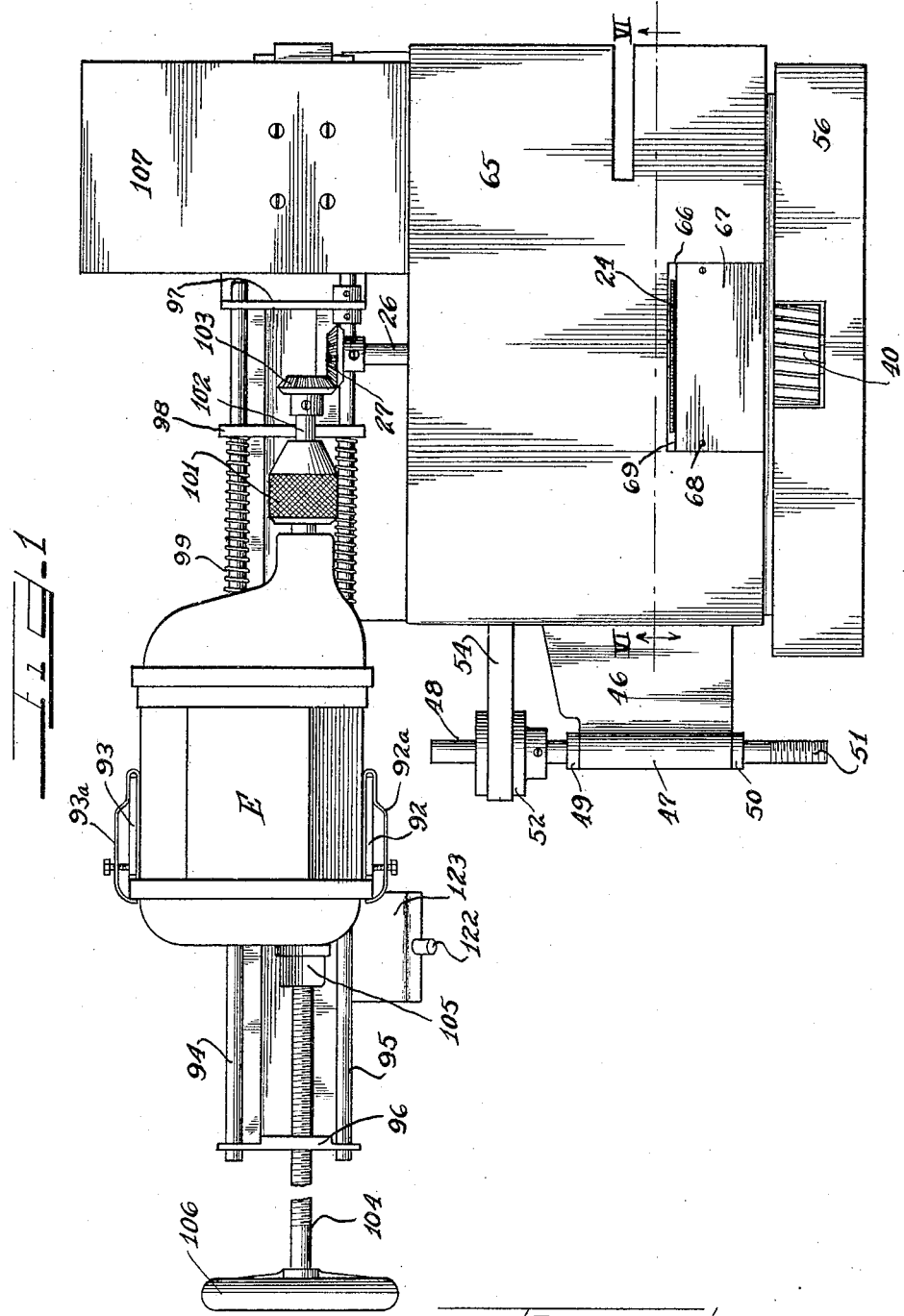

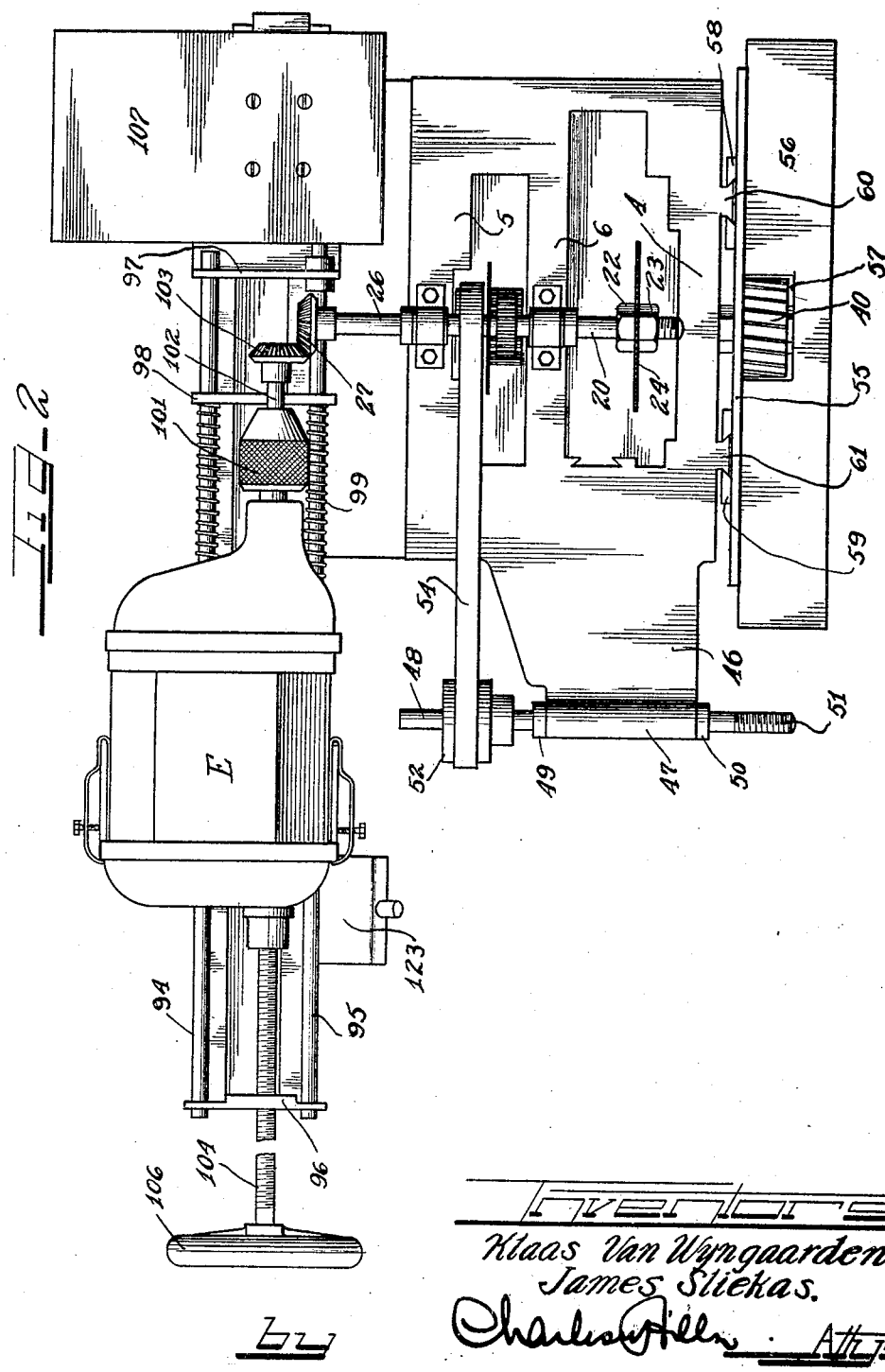

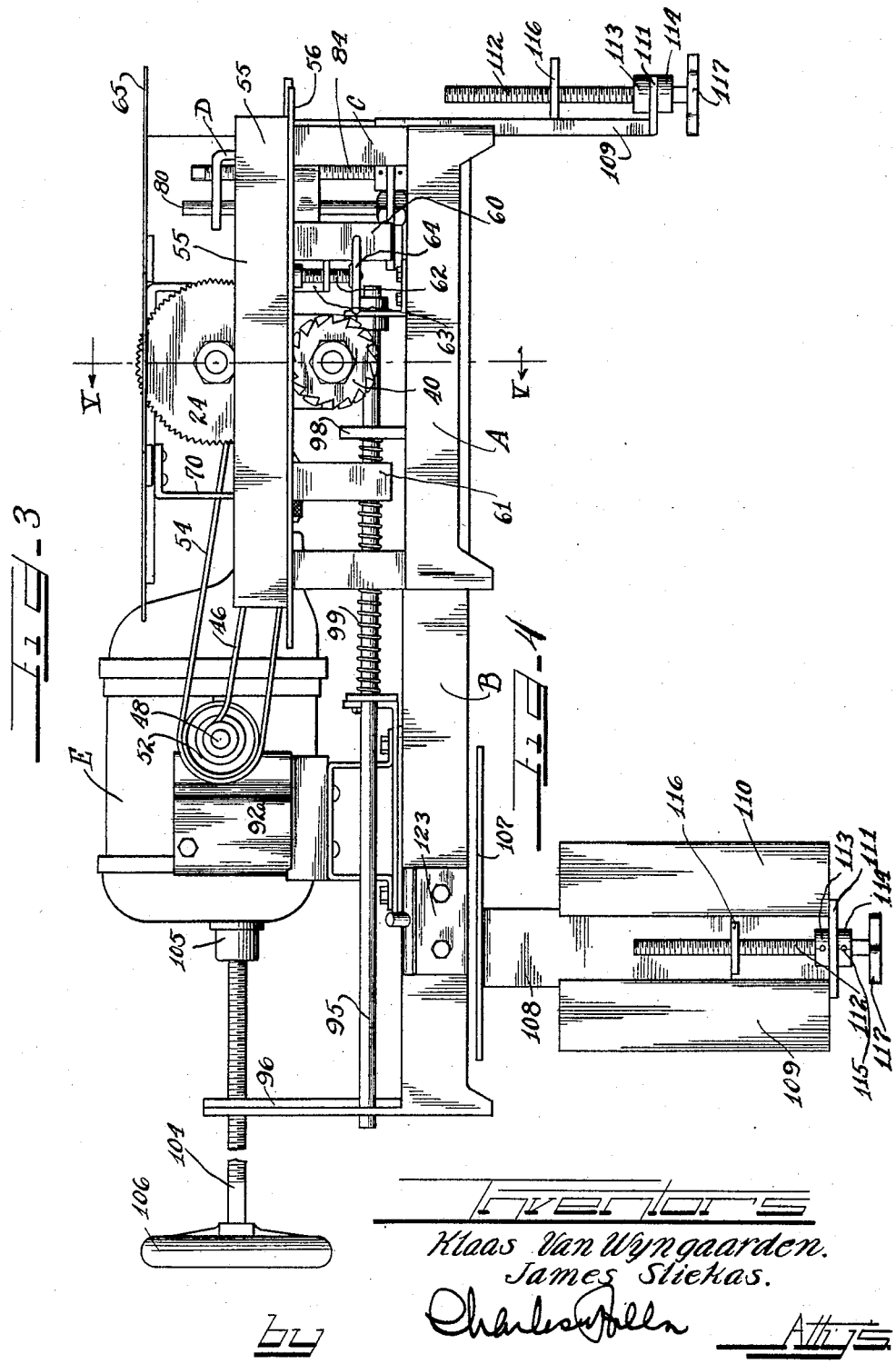

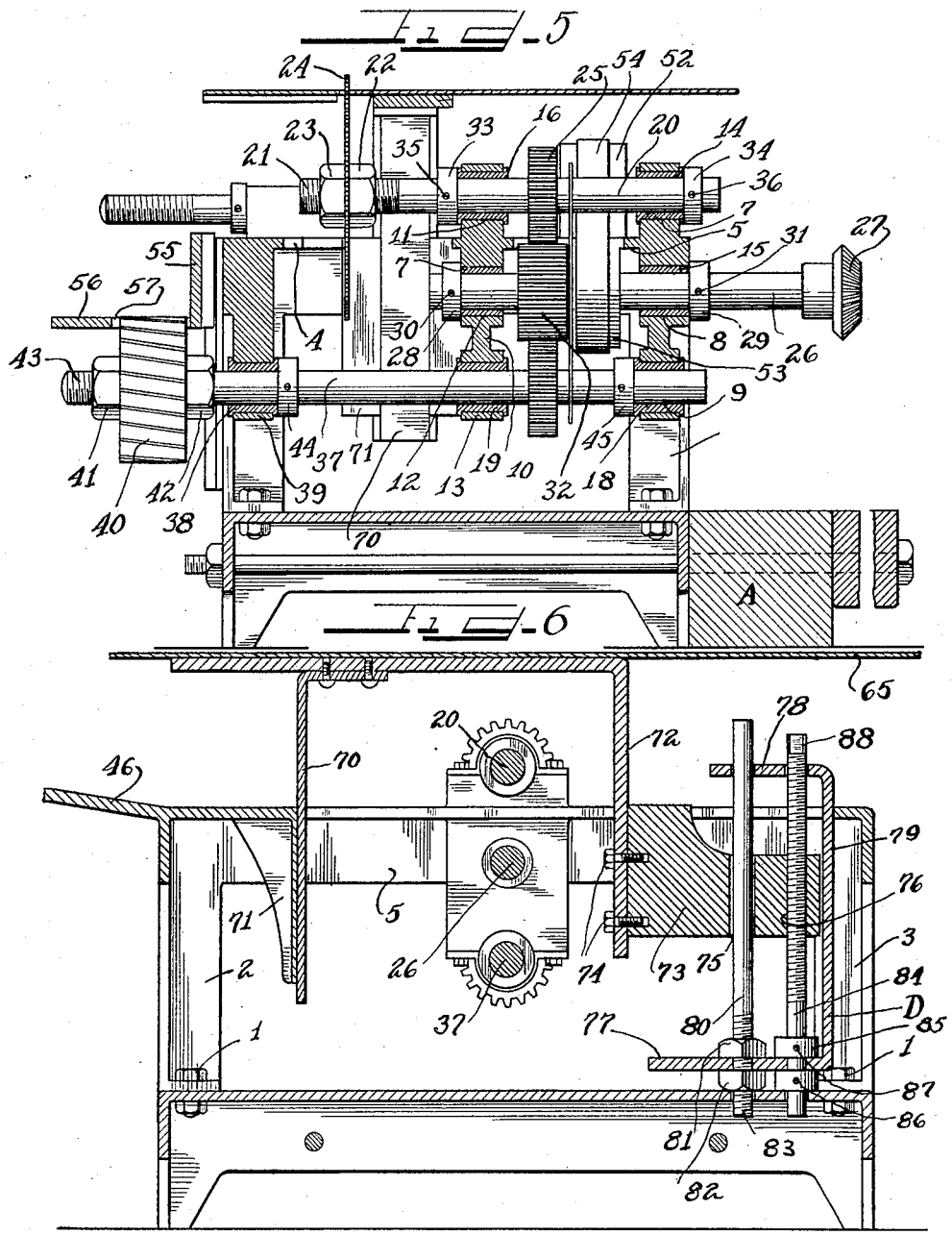

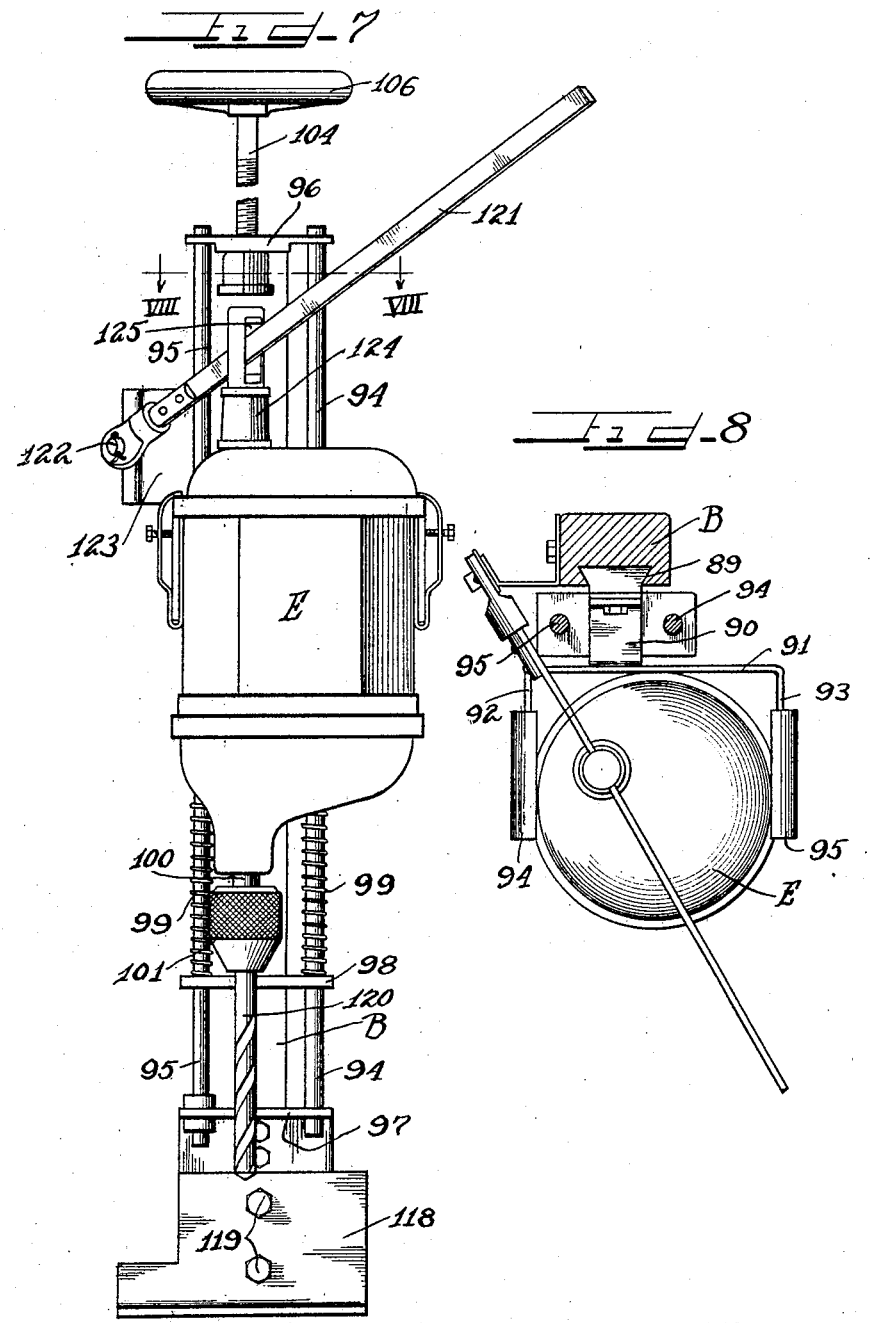

1,915,139

UNITED STATES PATENT OFFICE

KLAAS VAN WYNGAARDEN AND JAMES SLIEKAS, OF CHICAGO, ILLINOIS

COMBINATION MACHINE TOOL

Application filed May 8, 1931. Serial No. 535,960.

The present invention relates to a combination machine tool and particularly to a tool which may be readily used and installed in the home as well as in small shops for performing various and sundry operations on wood, metal and other materials.

The present invention is directed to a combination tool including a circular saw, a planer or jointer, a polisher or grinder, and drill and router tool, all of which may be utilized as desired, and which are combined in a compact, sturdy manner, and which may be manufactured at relatively low cost.

An object of the present invention is to provide a combination machine tool which is compact and sturdy, and which is efficient in use.

Another object of the invention is to provide a combination machine tool with various and sundry tools such as a circular saw, a jointer or planer, and a router together with suitable framework for supporting the parts of the tool and the work pieces and which may be readily operated for efficient use.

A further object of the invention is to provide a combination machine tool which includes a motor as a part thereof and which motor may be utilized to operate a saw or other tool and at the same time utilized as part of a drill press or router. The parts being so arranged as for ready adaptability of any tool to the work in question, also the tool is provided with adjustments of various of the parts entering into the same.

Generally speaking, the invention contemplates a tool including a circular saw, a jointer or router, a grinder or polishing spindle, and a drill press, actuated by a single motor, which motor may be disposed in horizontal position for performing certain parts of the work and disposed in vertical position for performing other functions.

The above, other and further objects of the invention will be apparent from the following description, accompanying drawings and appended claims.

Embodiments of the invention are illustrated in the accompanying drawings, and the views thereof are as follows:

Figure 1 is a top plan view of the form of combination machine tool chosen to exemplify the present invention.

Figure 2 is a view similar to Figure 1 with the saw table removed and showing certain details of construction.

Figure 3 is a side elevational view of the tool illustrated in Figures 1 and 2 and with the table or bench removed.

Figure 4 is an enlarged view of the adjusting mechanism for the router table illustrated at the right-hand end of Figure 3.

Figure 5 is a transverse vertical sectional view taken substantially in the plane of line V—V of Figure 3.

Figure 6 is a longitudinal vertical sectional view taken through the work table and frame, substantially in the plane of line VI—VI of Figure 1.

Figure 7 is a front elevational view of the motor and base vertically disposed for use as a drill press.

Figure 8 is a sectional view taken substantially in the plane of line VIII—VIII of Figure 7.

The drawings will now be explained.

The form of the apparatus chosen to exemplify the present invention is illustrated in the accompanying drawings and as there illustrated includes a tool base A, a motor base B which may be fastened together by bolts or other suitable fastening means.

A frame C is secured to the base A and is illustrated as a skeleton box-like member which is fastened by means of bolts 1 to the base A. The frame has front and back upright portions 2 and 3 respectively with top members 4 and 5. The top, as illustrated in Figure 2, includes the portions 4 and 5 respectively and also an intermediate portion 6, the parts between the portions 4 and 6 and 6 and 5 respectively being cut out.

The portion of the frame 5 is provided with, in the present instance, three apertures 7, 8 and 9 which are arranged vertically and downwardly in the order mentioned. An intermediate portion 10 of the frame is provided with apertures 11, 12 and 13 which align with the apertures 7, 8 and 9. The apertures 7 and 8 and 11 and 12 are provided with bushings 14, 15, 16 and 17 respectively, while the apertures 9 and 13 are provided with bushings 18 and 19. A shaft 20 is supported in the frame in the bushings 14 and 16 of the apertures 7 and 11 respectively which shaft is herein termed the saw shaft. One end of the shaft 20 terminates a slight distance beyond the outer face of the frame portion 5 and the other end of the shaft terminates inwardly of the other frame top member 4. The last mentioned end of the shaft 20 is threaded at 21 to receive nuts 22 and 23 for securing therebetween a circular saw 24. A gear 25 is fastened to the shaft 20 in any suitable manner.

A shaft, herein termed the main drive shaft 26, is supported in the bushings 15 and 17 of the apertures 8 and 12 respectively in the side and intermediate frame members. The main shaft 26 has one end terminating near the intermediate frame member and its other end projecting beyond the outer face of the rear side frame members. The outer end of the shaft is provided in the present instance with a bevel gear 27 which is suitably fastened to the shaft to rotate with the same. Shaft 26 is maintained in axial adjustment in its bearings by collars 28 and 29 which are secured to the shaft by means of set screws 30—31. The shaft 26 carries a gear 32 which is in mesh with the gear 25 on the saw shaft.

The saw shaft 20 is maintained in axial adjustment in the frame by means of collars 33 and 34 secured to the shaft by set screws 35 and 36 respectively.

A third shaft, herein termed the jointer shaft 37, is supported in the bushings 18 and 19 of the apertures 9 and 13 respectively and also by a bushing 38 in an aperture 39 in the front of the frame. The front end of the shaft 37 extends outwardly or beyond the front of the frame and is provided with a jointer hub or cutter 40 which is secured to the shaft by means of nuts 41 and 42 engaging the threaded end 43 of said shaft and lying one on each side of the cutter 40. The shaft 37 is maintained in axial position by means of collars 44 and 45 which are fastened to the shaft by suitable set screws. Gear 37a on shaft 37 is at all times in mesh with gear 32 on the shaft 26, thus driving shaft 26 simultaneously with shafts 20 and 37.

The top of the frame is provided with an extension 46 which carries an apertured bearing sleeve 47 in which is a shaft 48 herein termed the polisher shaft. The shaft 48 is maintained in the sleeve 47 by means of collars 49 and 50 fastened to the shaft 48 by set screws or similar means and bearing against the ends of the sleeve 47. One end 51 of the shaft 48 is threaded while a pulley 52 is suitably fastened to the other end of the shaft.

A pulley 53 is fastened to the main drive shaft 26. A belt 54 is trained over the pulleys 52 and 53 for driving the polisher shaft 48 whenever the main shaft 26 is rotated in a manner to be hereinafter described.

A work table for the jointer 40 is provided on the frame and the illustrated form thereof is substantially angle shaped with a vertical portion 55 and a horizontal portion 56, the latter having an opening 57 therein through which the jointer 40 projects for purposes well understood. The vertical portion 55 carries vertically disposed slides 58 and 59, each of which has a dove-tailed slot in the same. These slides 58 and 59 cooperate with dove-tailed projections 60 and 61 formed in the frame structure for maintaining the jointer support in horizontal alignment irrespective of the vertical adjustment of the same.

Adjustment of the jointer support is effected by means of a screw 62 carried in a bracket 63 fastened to the frame structure of the device. The screw 62 has threaded engagement with a portion of the bracket so as the same is turned in either direction the jointer work support will be raised or lowered as the case may be. A hand wheel 64 is secured to the screw 63 for operating the same in the manner described.

The arrangement of the illustrated form of the machine is such that the jointer 40 is outwardly of the front side of the frame with the work support therefor also outwardly of the front side of the frame.

A work table 65 for the saw 24 is provided and is supported in the frame structure for vertical adjustment. The saw table 65 is relatively large so as to support thereon wood or other material of suitable width or length for sawing purposes. A portion of the table 65 is cut out at 66 to receive the saw 27. A plate 67 is fastened to the saw support 65 by screws 68 and when in position the top thereof is flush with the top surface of the table 65. The size of the plate 67 is such as to provide a narrow slot 69 when the same is in position through which a portion of the saw 27 projects for sawing or other purposes.

The table 65 has a depending leg 70 fastened to the under side thereof which is guided against a portion 71 of the frame structure. The portion 71 provides a dovetail for receiving the guide 70 as is clearly shown in Figure 5.

The plate 65 has another depending member 72 which near its lower end is connected to a block 73 by means of bolts 74. The block 73 has an aperture 75 through the same and a threaded aperture 76, both of these apertures being vertically disposed and in parallel relation.

A bracket D having a lower leg 77 and an upper leg 78 connected by an upright part 79 carries a guide pin 80. The pin 80 is retained in the bottom leg 77 of the bracket B by means of two nuts 81 and 82 on the threaded end 83 of the pin and engaging the top and bottom surfaces of said bottom leg.

The pin 80 enters the aperture 75 in the block 73 and serves to guide the same in the up and down movement of the saw work table 65.

Another pin 84 which is threaded for the major portion of its length engages the threaded aperture 76 in the block 13 and is rotatably mounted in the bottom leg 77 of the bracket B, being retained therein by collars 85 and 86 each side of the bottom leg 77 of the bracket and fastened by means of set screws 87. The upper end of the pin 84 is provided with a squared portion 88 whereby a tool may be applied for turning the pin to raise or lower the saw table 65.

The saw table 65 and the members 70 and 72 and the connected block 73 with the bracket B may be removed bodily from the frame by lifting the same upwardly. When returning the saw table to the frame the ends of the pins 80 and 84 enter suitably disposed openings in the top of the base A.

The tool base B is made preferably as a casting and is provided with a longitudinally extending dove-tail 89 in which travels a motor carriage 90. The motor carriage includes a bracket 91 having up-turned ends 92 and 93 for entering pockets 92a and 93a respectively on a motor E.

A pair of guide rods 94 and 95 extend along the motor base C and on which the motor carriage travels. The rods 94 and 95 are carried in supports 96 and 97 formed as part of the base B. A plate 98 which may be formed as an integral part of the base B is provided with apertures through which the rods 94 and 95 pass. Springs 99 surround the rods 94 and 95 between the plate 98 and what is herein termed the front end of the motor E. The effect of the springs 99 is to oppose movement of the motor E in one direction, which direction is toward the right hand end of the base B as illustrated in the drawings and toward the lower end of the base B as illustrated in Figure 7.

The motor E is provided with a motor shaft 100 which receives a chuck 101.

When the motor E is utilized to drive the tool supported on the base A, the motor base B is disposed in horizontal position alongside of the base A and fastened thereto, and the chuck 101 is fitted with a stub shaft member 102 carrying a bevel gear 103 thereon which meshes with the bevel gear 27 on the main driving shaft 26 of the combination tool.

The motor E is maintained in proper position to keep the bevel gears 103 and 27 in mesh by means of a threaded screw 104 which is threaded in the threaded aperture in the end plate 96 of the base B and which screw carries at its inner end an enlarged member 105 for bearing against a portion of the motor E. A hand wheel 106 is provided for ease in turning the screw. The screw 104 is turned in such direction that the motor E is positioned on its base B so that the bevel gear 103 is maintained in mesh with the bevel gear 27, thereupon when the motor is actuated the various shafts 26, 20, 37 and 48 will be rotated simultaneously.

The speed of rotation of the several shafts may be varied by varying the bevel gears 103 and 27.

A router table 107 is supported on the right hand end of the motor base B when the base is horizontally disposed and the motor connected to the main driving shaft 26. The router table 107 is carried on a vertical arm 108 which is guided by members 109 and 110 which are spaced to therebetween receive the member 108. A plate 111 is secured to the lower ends of the members 109 and 110 and a screw 112 is supported in said plate by means of top and bottom collars 113 and 114, the collars being retained by set screws 115. A bracket 116 is struck out from the member 108 and is provided with a threaded aperture to receive the threaded screw 112. Hand wheel 117 is secured to the screw for ease in turning the same. The router support 107 is raised or lowered by turning the screw 112 in the proper direction. The router work rest 107 and its associated parts is removably secured to the base B of the motor.

The base B carrying the motor may be moved from association with the base A and disposed in vertical position whereby the motor E and its associated parts may be used as a drill press. When so utilized the router work table 107 is removed and two angle plates 118 are secured by means of bolts 119 on the lower end of the motor base B. When the motor E is arranged as a drill press in the manner described, the stub shaft 102 carrying the bevel gear 103 is removed and a drill 120 inserted in the chuck 101.

It is well known that considerable pressure sometimes is required to move a drill through a work-piece, and to this end when the motor base is disposed in vertical position for use as a drill press, a lever 121 is pivoted at 122 on a bracket 123 fastened to the motor base B. The fitting 124 having a slot 125 therein through which passes the lever 121 is supplied to what now becomes the upper end of the motor E. The operator bears down on the lever 121 to move the motor and its drill 120 downwardly against the opposition of the springs 99 so that the drill or whatever tool inserted in the chuck, may be brought into work engagement with the work piece underneath the same.

When the lever 121 is used the screw 104 is retracted to its outermost position so as to be out of the way when using the motor as a drill press.

The motor E may be used as a router for cabinet work, in which event the stub shaft 102 and its bevel gear 103 may be removed from the chuck 101 and a routing bit therein applied to engage a work piece held on the router table 107 by the hands of the operator. The terms "front", "lower" and "upper" and the like have been herein used in connection with the description of the present invention. The term "front" is applied to the side elevations of the apparatus as the same appear in the drawings. The motor E has been described as having upward and downward and inward and outward movement. The upward and downward movement being used with respect to Figures 7 and 8, and the inward and outward movement with respect to the other figures of the drawings. These and other terms are used merely for the purpose of convenience and not by way of limitations. Consequently, the claims are to be accordingly construed.

It will be observed that the combination tool of the present invention is one which is useful for performing various operations on metal, wood and the like and which lends itself very readily to adjustment and ease of operation. The motor unit may be utilized for driving the saws and related tools and may also be utilized separately as a drill press or similar tool.

The invention has been described herein more or less precisely as to details, yet it is to be understood that the invention is not to be limited thereby as changes may be made in the arrangement and proportion of parts and equivalents may be substituted without departing from the spirit and scope of the invention.

The invention is claimed as follows:

1. A combination machine tool including in combination, a tool base and a motor base, said bases being connected together as a unitary structure, a frame on the tool base, a plurality of tool shafts supported in said frame, tools on said shafts, a main shaft, said main shaft being operatively connected to said tool shafts for simultaneously operating the same, a motor on said motor base, said motor having a shaft, and a connection between the motor shaft and main shaft for actuating all of said tool shafts when said motor is in operation.

2. A combination machine tool including in combination, a tool base and a motor base, said bases being connected together as a unitary structure, a frame on the tool base, a plurality of tool shafts supported in said frame, tools on said shafts, a main shaft, said main shaft being operatively connected to said tool shafts for simultaneously operating the same, a motor on said motor base, said motor having a shaft, and a connection between the motor shaft and main shaft for actuating all of said tool shafts when said motor is in operation, a work support on said motor base, said motor being movable on the motor base towards and away from said work support, said motor being adapted for disconnection from said main shaft and then provided with a tool for engaging a work piece on said work support.

3. A combination machine tool including in combination, a motor base, a motor bodily movable on said base, a tool carried by said motor, interchangeable work supports for connection to said base, said base being disposed in horizontal position with one work support and disposed in vertical position with a different work support, means for moving said motor toward the selected work support in either position of said base for moving the carried tool into work engagement with a work piece on the work support, and spring means for moving said motor away from the work support.

4. A combination machine tool including in combination, a tool base, a motor base, a frame on said tool base, a plurality of tool shafts supported in said frame and connected for simultaneous rotation, tools on said shafts, one of said shafts having a bevel gear thereon, a motor on said motor base, said motor having a motor shaft, a chuck on said motor shaft, and a bevel gear supported by said chuck, and means for moving said motor on said motor base to mesh the bevel gear carried by the motor with the bevel gear carried by said frame.

5. A combination tool including a base, a motor base, said bases being connected together as a unitary structure, a frame on said first mentioned base, a plurality of shafts carried by said frame, said shafts being operatively connected for simultaneous rotation, one of said shafts having a bevel gear thereon outwardly of said frame, a motor on said motor base, said motor carrying a bevel gear in mesh with said first mentioned bevel gear for driving said plurality of shafts when said motor is actuated, and means on said motor base cooperating with said motor for maintaining said bevel gears in mesh.

6. A machine tool including in combination a frame, a plurality of tool shafts carried by said frame interconnected for simultaneous rotation, a motor operatively connected to one of said shafts for rotating all of said shafts, work supporting tables adjustably carried by said frame, tools carried by certain of said shafts, said tables being arranged adjacent said tools, and screw means for adjusting said tables.

In testimony whereof, we have hereunto subscribed our names at Chicago, Cook County, Illinois.

KLAAS VAN WYNGAARDEN.
JAMES SLIEKAS.